H. HENNIG.
PROCESS OF MAKING TIRE CASINGS.
APPLICATION FILED APR. 8, 1915.
1,170,154.  Patented Feb. 1, 1916.
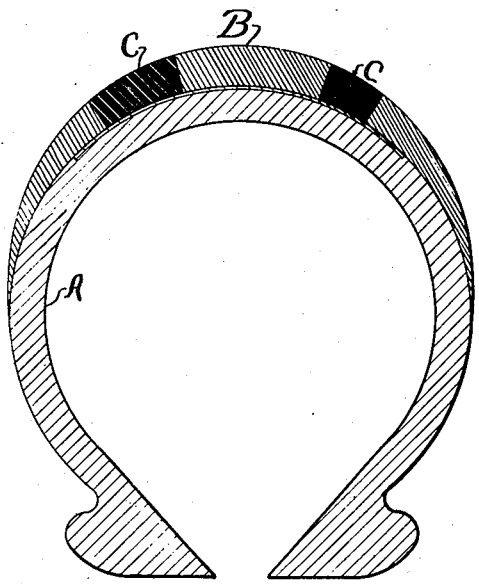
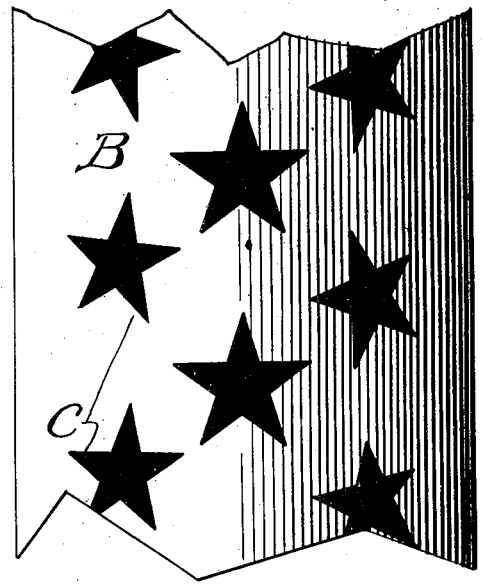
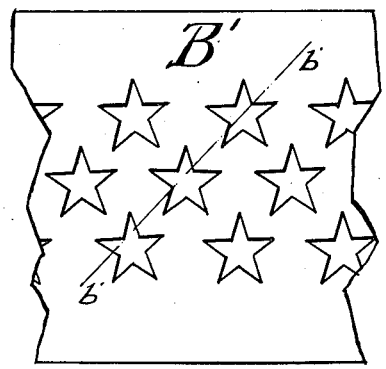
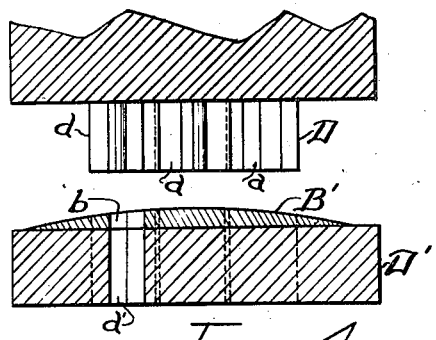
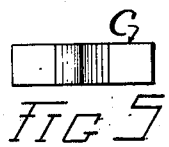

UNITED STATES PATENT OFFICE.

HUGO HENNIG, OF AKRON, OHIO, ASSIGNOR OF ONE-HALF TO ADELBERT HAUSCHILD, OF EAST PALESTINE, OHIO.

PROCESS OF MAKING TIRE-CASINGS.

1,170,154. Specification of Letters Patent. Patented Feb. 1, 1916.

Application filed April 8, 1915. Serial No. 19,930.

*To all whom it may concern:*

Be it known that I, HUGO HENNIG, a subject of the Emperor of Germany, residing at Akron, in the county of Summit and State of Ohio, have invented a certain new and useful Improvement in Processes of Making Tire-Casings, of which the following is a full, clear, and exact description, reference being had to the accompanying drawings.

The object of this invention is to provide for the manufacture of tire casings wherein the rubber tread shall have inlaid into it sections of a different character of rubber. The inlaid sections are preferably of softer rubber than the body of the tread, thus giving the tire non-skidding characteristics, notwithstanding the fact that the surface is smooth. The inlays are preferably of a different color from the body of the tread, wherefore the finished casing has a very distinctive and striking appearance, attractive in itself and presenting great advertising value.

In performing my process I take a strip of uncured rubber, designed to form the body of the tread, and punch holes through it. From different stock of partially cured rubber (preferably softer and of a different color) I punch holes with the same punch and die. I then take the parts punched out in the last mentioned operation, soften their edges with a suitable rubber solvent, and insert them into the openings in the tread strip. When the composite tread thus described is in place in the tire casing, the whole casing is vulcanized and the inserts firmly adhere to the body of the tread.

The drawing shows my completed tire casing and also the casing in its various steps of completion.

Figure 1 is a side elevation of the completed tire casing; Fig. 2 is a plan thereof; Fig. 3 is a plan of the tread strip after it has been punched and before the inserts have been put in place; Fig. 4 is a cross section of a suitable punch and die showing the tread strip between them; Fig. 5 is an edge view and Fig. 6 is a plan of the inlay member.

As shown in Fig. 1, A indicates any usual body for a tire casing, and B indicates the rubber tread strip. C indicates the inlays in the tread strip which, in this instance, are shown as star-shaped. By making these inlays, of whatever particular shape they take, of a different color from the rest of the tread, they present a very distinctive appearance; by being of softer rubber than the rest of the tread, the inlays give inwardly in use and thus carry grit, which gives a non-skidding characteristic to the tire.

Figs. 3 and 4 show at $B^1$ the tread strip before it is applied. This strip is made of the usual shape and size for a tread strip and then holes $b$ are punched into it. Where the inlays are star-shaped, for example, it is very convenient to arrange several of these inlays in a diagonal row across the tire, as indicated by the broken line $b^1$—$b^1$, in Fig. 3.

Fig. 4 shows a punch and die specifically adapted for punching three openings in a diagonal row across the tread strip. In this view, D indicates the male die and $D^1$ the female. The projections $d$ of the punching die are, of course, of the shape desired for the inlay. The view shows three of these projections star-shaped and in a diagonal row. The openings $d^1$ of the coöperating die have a similar shape and position and are only enough larger than the punches to allow convenient operation. The strip $B^1$, of sufficient length to extend around the tire and of the proper width to reach from one side of the tire to the other, may be inserted between these dies, and a diagonal row of openings punched through it, then the strip moved longitudinally, a second set of openings punched, and so on, until holes have been punched through the length of the strip.

With the same punch and die and from suitable stock having approximately the thickness of the strip $B^1$, I punch the members C which are to constitute the inlays, the difference between this and the operation just described being that, in this case, I preserve the punched-out portions, whereas, in the former, the stencil is preserved. I now take the punched out portions, shown as the stars C, and immerse them in a suitable rubber solvent, preferably benzole. Then these inlays are picked out, one at a time, from the solvent—a convenient method being by means of a pin stuck into them—and are inserted into the openings $b$ in the tread member. The solvent softens the edges of the inlays so that they may readily be slid by hand into the openings of the tread or stencil member. After they are inserted and the strip, with the inlays, is in place on the usual tire carcass, the whole structure is vulcanized in the usual manner to produce the complete casing.

Having thus described my invention, what I claim is:

1. The method of making tire casings having inlays, consisting of punching openings in a rubber tread strip and inserting in these openings rubber inlays of a composition different from the tread strip, the outer faces of such inlays being flush with the tread surface, securing the tread in place on a tire carcass, and vulcanizing the casing thus produced.

2. The method of making tire casings consisting of punching through the tread strip a series of holes, punching holes of the same size through rubber stock of other composition, inserting the punched out portions of the last mentioned stock in the openings provided in the strip, mounting the tread on a carcass, and vulcanizing the casing thus produced.

3. The process of making tire casings consisting of making openings in a tread strip and inserting in these openings rubber pieces softer than the tread strip and having their outer faces flush with that of the tread, and securing such compound tread in place on a tire carcass.

4. The process of making tire casings consisting of making openings in a member to constitute a tread strip, making inlay members of a different composition of rubber and of a size corresponding to the openings, softening the edge walls of one of these members by a rubber solvent, inserting the inlay members into the strip member, and mounting the tread on a tire carcass.

5. The process of making tire casings consisting of making a stencil for a tread strip, making inlays of a different composition from the tread strip, said inlays being adapted to fit the openings in the stencil, immersing the inlays in rubber solvent, thereafter inserting them in the stencil openings, and thereafter vulcanizing the inlaid strip in place on a tire carcass.

In testimony whereof, I hereunto affix my signature in the presence of two witnesses.

HUGO HENNIG.

Witnesses:
W. E. SNYDER,
ADELBERT HAUSCHILD.